United States Patent
Wang et al.

(10) Patent No.: US 8,922,173 B2
(45) Date of Patent: Dec. 30, 2014

(54) DC CHOPPER AND DC CHOPPING METHOD FOR DOUBLY FED INDUCTION GENERATOR SYSTEM

(75) Inventors: Chang-Yong Wang, Shanghai (CN); Jian-Fei Zheng, Shanghai (CN); Fei Lu, Shanghai (CN); Jian-Ping Ying, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 366 days.

(21) Appl. No.: 13/532,356

(22) Filed: Jun. 25, 2012

(65) Prior Publication Data

US 2013/0049707 A1 Feb. 28, 2013

(30) Foreign Application Priority Data

Aug. 23, 2011 (CN) .......................... 2011 1 0243259

(51) Int. Cl.
*H02P 11/00* (2006.01)
*H02H 7/06* (2006.01)
*H02P 6/00* (2006.01)

(52) U.S. Cl.
CPC ........................................ *H02P 6/00* (2013.01)
USPC ............................... 322/24; 290/44; 290/55

(58) Field of Classification Search
CPC ........................................................ H02P 6/00

USPC .......................................... 322/24; 290/44, 55
See application file for complete search history.

(56) References Cited

U.S. PATENT DOCUMENTS

| | | | |
|---|---|---|---|
| 6,774,608 B2 * | 8/2004 | Hofstetter et al. .............. | 322/24 |
| 6,856,040 B2 * | 2/2005 | Feddersen et al. .............. | 290/44 |
| 2007/0279815 A1 * | 12/2007 | Li et al. ........................... | 361/54 |
| 2009/0008937 A1 * | 1/2009 | Erdman et al. .................. | 290/44 |
| 2009/0079193 A1 * | 3/2009 | Nielsen et al. .................. | 290/44 |
| 2011/0210553 A1 * | 9/2011 | Engelhardt et al. ............. | 290/44 |

* cited by examiner

*Primary Examiner* — Tulsidas C Patel
*Assistant Examiner* — Thomas Quigley
(74) *Attorney, Agent, or Firm* — CKC & Partners Co., Ltd.

(57) ABSTRACT

A DC chopper comprising a control unit and a power circuit and a DC chopping method for a DFIG (doubly fed induction generator) system are provided. The input terminal of the control unit is coupled to a DC capacitor of a converter to detect a DC voltage. The power circuit includes input terminals, an overvoltage protection module, a rectifier module and output terminals. The overvoltage protection module comprises at least one discharge unit formed from a discharge resistor and a switch element, and the rectifier module is coupled in parallel to the overvoltage protection module. When a grid voltage drops, the control unit outputs a corresponding control signal to drive the switch element to be ON or OFF, and the output terminal of the power circuit absorbs a portion of rotor inrush current, so as to impose over-current protection.

17 Claims, 6 Drawing Sheets

DC CHOPPER AND DC CHOPPING METHOD FOR DOUBLY FED INDUCTION GENERATOR SYSTEM

RELATED APPLICATIONS

This application claims priority to Chinese Application Serial Number 201110243259.5, filed Aug. 23, 2011, which is herein incorporated by reference.

BACKGROUND

1. Field of Invention

The present invention relates to a wind power generation technology. More particularly, the present invention relates to a method for low voltage ride-through (LVRT) in a DFIG (doubly fed induction generator) system.

2. Description of Related Art

With the increasingly acute energy crisis and environmental issues, countries all over the world are vigorously developing renewable energy businesses, such as wind power generation and solar energy generation. Taking the wind power generation as an example, the wind power installed capacity in China is developing rapidly, from a stall-regulated wind power system to a variable-speed and constant-frequency (VSCF) wind power system, and from a wind power system with a gear case to a direct-drive wind power system without the gear case.

However, with continuously increasing of the wind power installed capacity, after grid-connected power generation is implemented, the influence of the increased wind power installed capacity on the electric grid cannot be simply ignored any more. For example, in order to deal with the influence of the wind power generator set on the electric grid, many countries in Europe have established new rules regulating new requirements on the grid-connected wind power generation, such as controls of active power and reactive power, controls of voltage and frequency, controls of electric power quality and a function of low voltage ride-through. When the grid-connected wind power generator set meets these requirements, then even if the electric grid fails (such as, voltage drops), the connected grid still can be operated uninterruptedly, so as to provide active power and reactive power to the electric grid rapidly, and thus the voltage and frequency of the electric grid can be recovered and becomes stable timely.

Taking a DFIG as an example, when the low voltage ride-through is implemented, in general, an AC crowbar is coupled to the rotor side of the power generator in parallel, or alternatively, a DC chopper is coupled to a DC link in parallel, so as to respectively prevent the bus overvoltage and the rotor-side inverter overcurrent caused by the drop and recovery of the grid voltage. However, the AC crowbar or DC chopper described above mainly has the following disadvantages: (1) for a passive-mode AC crowbar, over-voltage protection and over-current protection can only be performed after the crowbar is switched in and drive signals from the rotor-side inverter are locked simultaneously, and the switching-in of the passive-mode AC crowbar allows a DFIG to absorb large amounts of reactive power from the electric grid for long term, which is harmful to the stability recovery of the electric power system; (2) during the period in which the grid voltage drops and recovers, an active AC crowbar can deliver reactive power or active power only after the rotor-side inverter is turned on, but the rotor-side inverter and the AC crowbar cannot work at the same, and thus the rotor inrush current and the bus overvoltage may occur again when a converter works again; (3) when being incorporated into the DFIG system, the existing DC chopper can only prevent the bus overvoltage of the converter but cannot prevent the over-current of the rotor-side inverter, thus resulting in an excessively large selection range of the rotor-side converter device; and (4) when the AC crowbar and the DC chopper are used concurrently, if the grid voltage drops, upon being switched to the AC crowbar in the DFIG system, the drive signals of the rotor-side inverter need to be locked, thus causing many inconveniences for flexibly controlling a transducer.

In view of this, it is an issue desired to be solved by those with relevant skills in this industry regarding how to design a novel protection circuit, in which the rotor-side inverter overcurrent of the converter can be prevented effectively while the bus overvoltage protection of the converter is implemented.

SUMMARY

In order to solve the above disadvantages of the DFIG system in the prior art, the present invention discloses a DC chopper and a DC chopping method for the DFIG system.

An aspect of the present invention is to provide a DC chopper of the DFIG system. The DFIG system includes a converter and a DFIG, and the DC chopper includes a control unit and a power circuit. The control unit has at least one input terminal and an output terminal. The input terminal of the control unit is electrically coupled to two terminals of a DC capacitor of the converter, so as to detect a DC voltage. The power circuit is electrically coupled to the converter, the DFIG and the control unit. The power circuit includes an input terminal, an overvoltage protection module, a rectifier module and an output terminal. The input terminal is coupled in parallel to the DC capacitor of the converter, and the DC capacitor is located between a grid-side inverter and a generator-side inverter of the converter. The overvoltage protection module is coupled to the input terminal of the power circuit. The overvoltage protection module includes at least one discharge unit having a discharge resistor and a switch element which are coupled in series, and the switch element is electrically coupled to the output terminal of the control unit. The rectifier module is coupled to the overvoltage protection module in parallel. The output terminal is coupled to the rectifier module and the DFIG. When a grid voltage of the DFIG system drops, the output terminal of the control unit outputs a corresponding control signal according to the detected DC voltage, so as to drive the switch element to be on or off, and the output terminal of the power circuit absorbs a portion of the rotor inrush current from the DFIG, so as to impose the over-current protection on the generator-side inverter.

When the grid voltage of the DFIG system drops, and the DC voltage detected by the control unit is higher than a first predetermined voltage, the output terminal of the control unit outputs a first control signal to drive the switch element to be on. In an embodiment, when the grid voltage of the DFIG system drops, and the detected DC voltage is higher than the first predetermined voltage, another output terminal of the control unit still sends a driving signal to the generator-side inverter of the converter to allow the generator-side inverter to be operated normally, and thus the DFIG system delivers the reactive power to the electric grid, so as to satisfy the LVRT requirement.

In another embodiment, the discharge unit further includes a freewheeling unit coupled to the discharge resistor in parallel, so as to provide a freewheeling circuit for the discharge resistor when the switch element is driven to be off.

In a further embodiment, the overvoltage protection module includes a plurality of discharge units, and the switch elements in at least a portion of the discharge units are driven to be on simultaneously, so as to drive the overvoltage protection module into operation.

In yet a further embodiment, the power circuit further includes a first common mode choke arranged between the rectifier module and the output terminal of the power circuit, so as to suppress the common mode current.

In still a further embodiment, the power circuit further includes a second common mode choke arranged between the input terminal of the power circuit and the overvoltage protection module, so as to suppress the common mode current.

In an embodiment, when the DC voltage detected by the control unit is lower than a second predetermined voltage, the output terminal of the control unit sends a second control signal, so as to drive the switch element to be off.

Another aspect of the present invention is to provide a DC chopping method for the DFIG system. The system includes a converter and a DFIG. The system further includes a DC chopper according to an aspect of the present invention, and the DC chopping method includes the following steps: the control unit detects a DC voltage loaded on the DC capacitor of the converter in real time; when the grid voltage of the DFIG system drops, the output terminal of the control unit outputs a corresponding control signal according to the detected DC voltage, so as to drive the switch element to be on or off; and the output terminal of the power circuit absorbs a part of the rotor inrush current from the DFIG, so as to impose the over-current protection on the generator-side inverter.

A further aspect of the present invention provides a DC chopping method for the DFIG system. The system includes a converter and a DFIG. The DC chopping method includes: detecting a DC voltage loaded on a DC capacitor of a converter in real time; when the grid voltage of the DFIG system drops, outputting a corresponding control signal according to the detected DC voltage, so as to drive a switch element to be on or off; when the detected DC voltage is higher than a first predetermined voltage, outputting a first control signal to drive the switch element to be on; and when the detected DC voltage is lower than a second predetermined voltage, outputting a second control signal according to the DC voltage, so as to drive the switch element to be off.

By using the DC chopper of the present invention and the method thereof, the input terminal of the control unit is electrically coupled to two terminals of the DC capacitor of the converter, so as to detect a DC voltage in real time. If the detected DC voltage is higher than the predetermined threshold voltage, the control unit outputs a control signal, so as to drive the switch element on, thereby enabling the overvoltage protection module. Simultaneously, the output terminal of the power circuit of the DC chopper can also absorb a part of the rotor inrush current from the DFIG, so that the rotor inrush current flowing into the rotor-side inverter of the converter is low, thereby implementing the over-current protection of the rotor-side inverter. Furthermore, when the DC chopper is driven into operation, the driving signal of the rotor-side inverter does not need to be locked, and thus the control manner of the converter is much more flexible.

BRIEF DESCRIPTION OF THE DRAWINGS

In order to make the foregoing as well as other aspects, features, advantages, and embodiments of the present invention more apparent, the accompanying drawings are described as follows.

DETAILED DESCRIPTION

Figure 1:
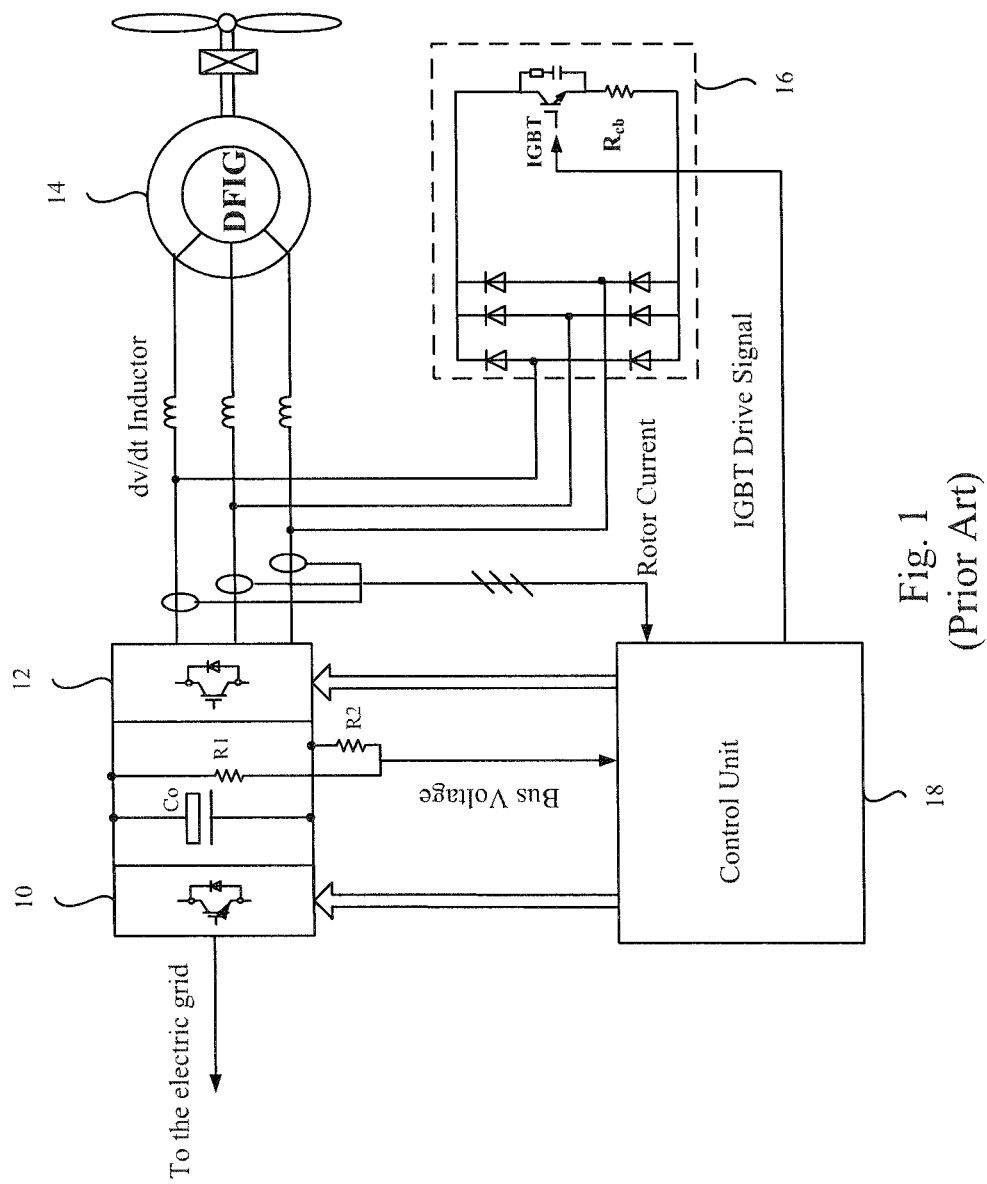
FIG. 1 illustrates a schematic circuit diagram of an AC crowbar adopted by a DFIG system in an existing technology for protecting a converter when low voltage ride-through is implemented.

In order to make the technical contents of the present invention more detailed and more comprehensive, various embodiments of the present invention are described below with reference to the accompanying drawings, wherein like reference numerals refer to like elements throughout. However, those of ordinary skills in the art should understand that the embodiments described below are not used for limiting the scope of the present invention. Moreover, the accompanying drawings are only illustrative and are not made according to the original size.

In each accompanying drawing of the present invention, only the relevant circuits, relevant detected signals, relevant electronic elements or structures used for implementing over-current and/or overvoltage protection of a converter when a DFIG system implements low voltage ride-through are listed. It should be understood by those of skills that if suitable for the present invention, in the DFIG system or other types of wind power generation systems, the detecting and processing of each general electric signal of a converter having a grid-side inverter and a generator-side inverter, a electric grid and a generator, and various processing steps during operation of a grid-connected wind power generator should be incorporated herein by reference. For example, the electric signal mentioned above may be a sampling and controlling signal of the stator current and stator voltage, a sampling and controlling signal of the rotor current, a sampling and controlling signal of the grid voltage and grid current, a driving on or off signal of a grid-connected switch element, and the like. Specific implementations in various aspects of the present invention are further described in details below with reference to the accompanying drawings.

FIG. 1 illustrates a schematic circuit diagram of an AC crowbar adopted by a DFIG system in an existing technology for protecting a converter when low voltage ride-through is implemented. Referring to FIG. 1, the DFIG system includes a grid-side inverter 10, a generator-side inverter 12 (or called rotor-side inverter), a DFIG 14, an AC crowbar 16 and a control unit 18. The control unit 18 provides driving signals respectively for normal operation of the grid-side inverter 10 and the generator-side inverter 12, and the other terminal of the control unit 18 is coupled to the node between resistors R1 and R2, so as to detect a DC voltage loaded on a DC capacitor $C_o$ of the converter in real time. For example, when a grid voltage drops, the amount of the DC voltage is increased, so that the control unit 18 may compare the detected DC voltage with a predetermined threshold voltage of the overvoltage protection. If the current DC voltage is higher than the predetermined threshold voltage of overvoltage protection, an output terminal of the control unit 18 sends an IGBT (insulated gate bipolar transistor) driving signal to the AC crowbar 16, so as to drive an IGBT to be on, and thus the AC crowbar 16 absorbs the remaining energy from the DFIG side caused by the grid voltage drop. Similarly, when the rotor current flowing into the generator-side inverter 12 is detected, for example, by a Hall sensor, to be higher than a predetermined threshold current of over-current protection, the output terminal of the control unit 18 can also sends an IGBT driving signal to the AC crowbar 16, so as to drive the IGBT to be on, and thus the AC crowbar 16 absorbs the remaining energy generated by the grid voltage drop.

However, for either the overvoltage of the DC voltage loaded by the DC capacitor of the converter, or the overcurrent of the rotor current flowing into the generator-side inverter, when the AC crowbar 16 is switched on, the control unit 18 often needs to stop sending the driving signal which is generated for normal operation of the generator-side inverter 12. That is, when the AC crowbar is switched on for enabling a braking function, the control unit 18 does not send the driving signal, so that the generator-side inverter 12 is locked. Thus, in the case that the generator-side inverter 12 is locked, the converter fails to send reactive power or active power for stabilizing the grid voltage or frequency, thus causing many inconveniences for control of the converter. On the other hand, when the AC crowbar 16 is switched off, the converter works again. Although the generator-side inverter 12 can send reactive power, yet over-current and overvoltage situations are caused again while the converter works again, and therefore the AC crowbar needs to be activated many times, thus resulting in low efficiency.

Figure 2:
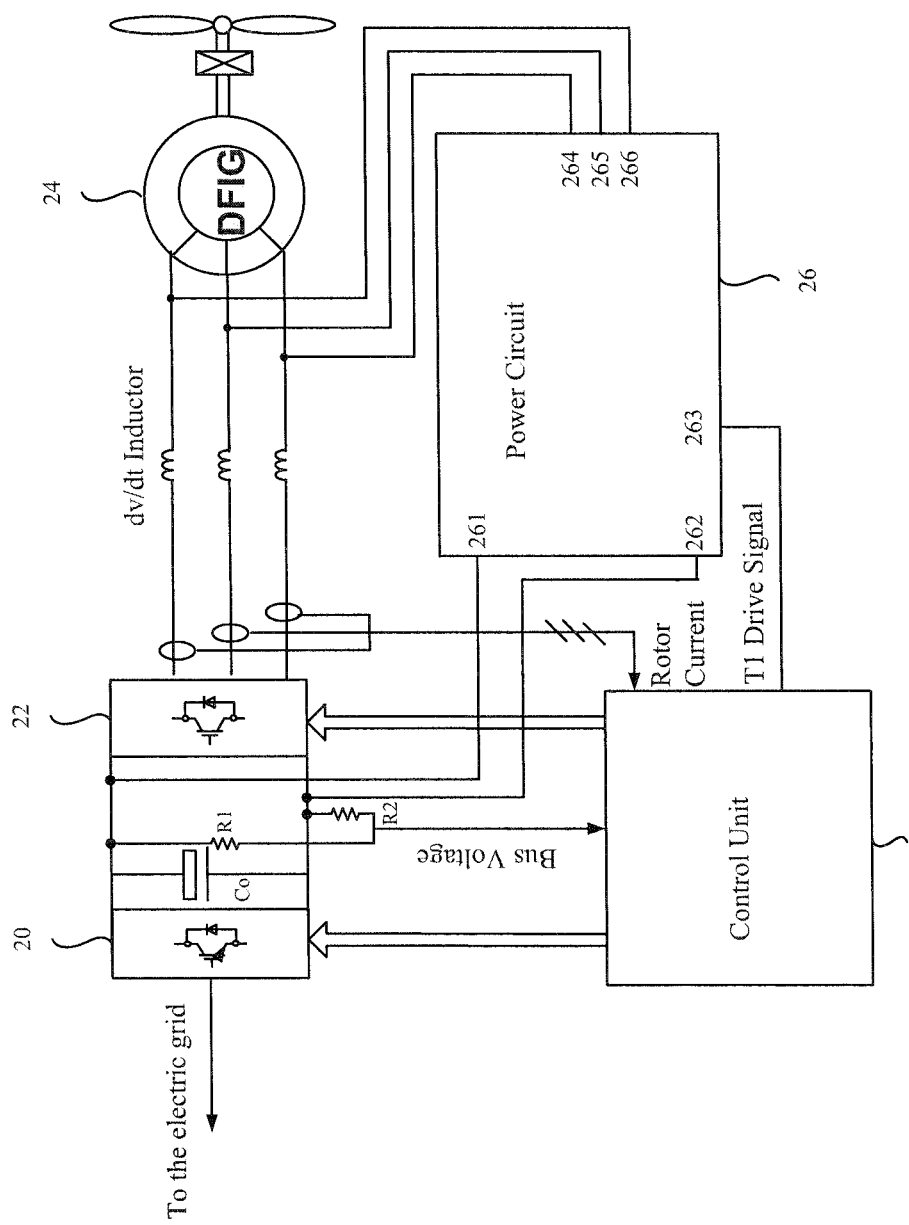
FIG. 2 illustrates a schematic circuit diagram of a DC chopper of the DFIG system according to an aspect of the present invention.

In order to solve the aforementioned disadvantages shown in FIG. 1, the present invention provides a DC chopper of the DFIG system. In particular, FIG. 2 illustrates a schematic circuit diagram of the DC chopper of the DFIG system according to an aspect of the present invention. Referring to FIG. 2, the DC chopper includes a control unit 28 and a power circuit 26. The control unit 28 is electrically coupled to a grid-side inverter 20, a generator-side inverter 22 and the power circuit 26. The power circuit 26 is electrically coupled to a DC capacitor $C_o$ of the converter, a control unit 28 and a DFIG 24.

The control unit 28 has at least one input terminal and an output terminal, and in particular, the input terminal of the control unit is electrically coupled to two terminals of the DC capacitor of the converter, so as to detect the DC voltage. For example, a terminal of the resistor R1 is coupled to a terminal of the DC capacitor $C_o$, and a terminal of the resistor R2 is coupled to the other terminal of the DC capacitor $C_o$. At this time, the input terminal of the control unit 28 is coupled to the node between the resistors R1 and R2, and the DC voltage loaded on the two terminals of the DC capacitor $C_o$, i.e., the bus voltage, is detected by detecting the electric potential of the node. Two output terminals of the control unit 28 are respectively coupled to the grid-side inverter 20 and the generator-side inverter 22, so as to provide driving signals for operation of the inverters. Another output terminal of the control unit 28 is coupled to the circuit 26, so as to provide a driving signal for driving the switch element of the power circuit 26 to be on or off. In a specific embodiment, another input terminal of the control unit 28 is electrically coupled to a current sensor, so as to detect the rotor current flowing into the generator-side inverter 22.

The power circuit 26 includes input terminals 261 and 262, and the power circuit 26 is coupled to the DC capacitor of the converter through the input terminals 261 and 262. As mentioned above, the DC capacitor is located between the grid-side inverter 20 and the generator-side inverter 22 of the converter. The input terminal 263 is electrically coupled to the control unit 28 for receiving the driving signal required for driving the switch element to be on or off. For example, when the grid voltage drops, if the DC voltage detected by the control unit 28 is an overvoltage, the switch element is switched on, so as to enable the overvoltage protection function on the power circuit 26; and if the DC voltage detected by the control unit 28 is lower than the predetermined voltage (such as a normal operation voltage), the switch element is switched off. It should be pointed out that the power circuit 26 can implement the DC chopping function through the switch element. The power circuit 26 further includes output terminals 264, 265 and 266 respectively coupled to the phases of the DFIG 24. The power circuit 26 provides a bypass circuit for the rotor inrush current through the output terminals 264, 265 and 266 when the grid voltage drops or recovers. Those with skills in the art should understand that, for the power circuit 26, the terms "input terminal" and "output terminal" merely illustrates the flowing directions of the electric signal exemplarily, and are not limited to their literal meanings. For example, when the power circuit 26 is implemented with the over-current protection, the output terminals 264-266 are output directions for the DFIG, and are input directions for the power circuit 26. However, regardless of the output directions or the input directions, the three terminals of the power circuit 26 are fixed relative to each other.

Figure 3:
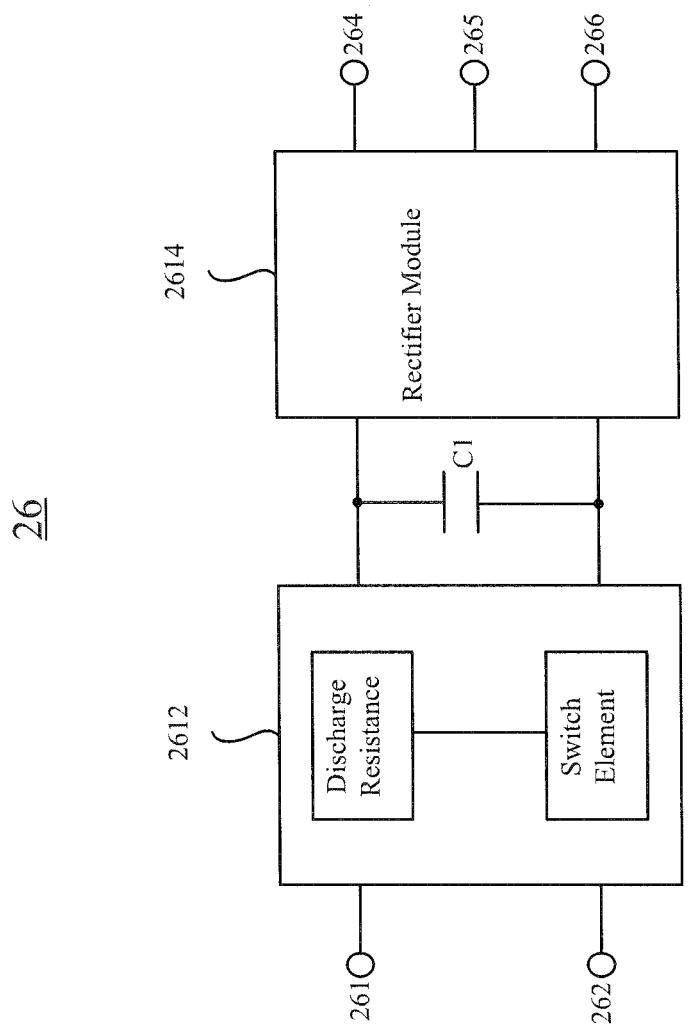
FIG. 3 illustrates a structure block diagram of a power circuit of the DC chopper in FIG. 2.

FIG. 3 illustrates a structure block diagram of the power circuit of the DC chopper in FIG. 2. Referring to FIG. 3, the power circuit 26 of the DC chopper includes an overvoltage protection module 2612 and a rectifier module 2614. The overvoltage protection module 2612 is used for implementing overvoltage protection of the converter, and the rectifier module 2614 is used for imposing over-current protection on the generator-side inverter 22 of the converter.

The overvoltage protection module 2612 electrically coupled to the input terminals 261 and 262 of the power circuit 26 includes at least one discharge unit formed from a discharge resistor and a switch element coupled in series, and the switch element is electrically coupled to the output terminal of the control unit 28, so as to drive the switch element to be on or off according to the detected DC voltage. For example, the switch element is a fully-controlled power element. In an embodiment, when the DC voltage detected by the control unit is higher than the predetermined threshold voltage of the overvoltage protection, the control unit 28 outputs a control signal, so as to drive the switch element to be on; and when the DC voltage detected by the control unit is lower than the predetermined normal operation voltage, the control unit 28 outputs another control signal, so as to drive the switch element to be off.

The rectifier module 2614 and the overvoltage protection module 2612 are coupled in parallel, and the output terminals of the rectifier module 2614 are coupled respectively to the output terminals 264, 265 and 266 of the power circuit 26. For example, the rectifier module 2614 is a three-phase bridge rectification circuit. A filter capacitor C1 may also be arranged between the rectifier module 2614 and the overvoltage protection module 2612. In an embodiment, when the grid voltage of the DFIG system drops and the DFIG 24 generates a high rotor inrush current, the output terminals 264-266 of the power circuit 26 absorbs or shunts a portion of the rotor inrush current through the rectifier module 2614. At this time, the amount of the rotor inrush current flowing into the generator-side inverter 22 of the converter is decreased, so as to impose the over-current protection on the generator-side inverter 22. Thus, when the DC chopper is driven into operation, the driving signals for the generator-side inverter 22 are decreased or do not need to be locked, so that compared with the prior art, the control manner of the converter of the present invention is more flexible.

In a specific embodiment, when the grid voltage of the DFIG system drops, and the detected DC voltage is higher than the predetermined threshold voltage of the overvoltage protection, the output terminal of the control unit 28 still sends driving signals to the generator-side inverter 22 of the converter to allow the generator-side inverter to be operated normally, and thus the reactive power is sent to the electric grid, so as to satisfy the LVRT requirement. Moreover, when the grid voltage of the DFIG system drops, and the drop time is longer than the predetermined time, or the voltage or current is higher than the maximum protection value that the converter can endure, the output terminal of the control unit stops sending driving signals to the generator-side inverter of the converter.

Figure 4:
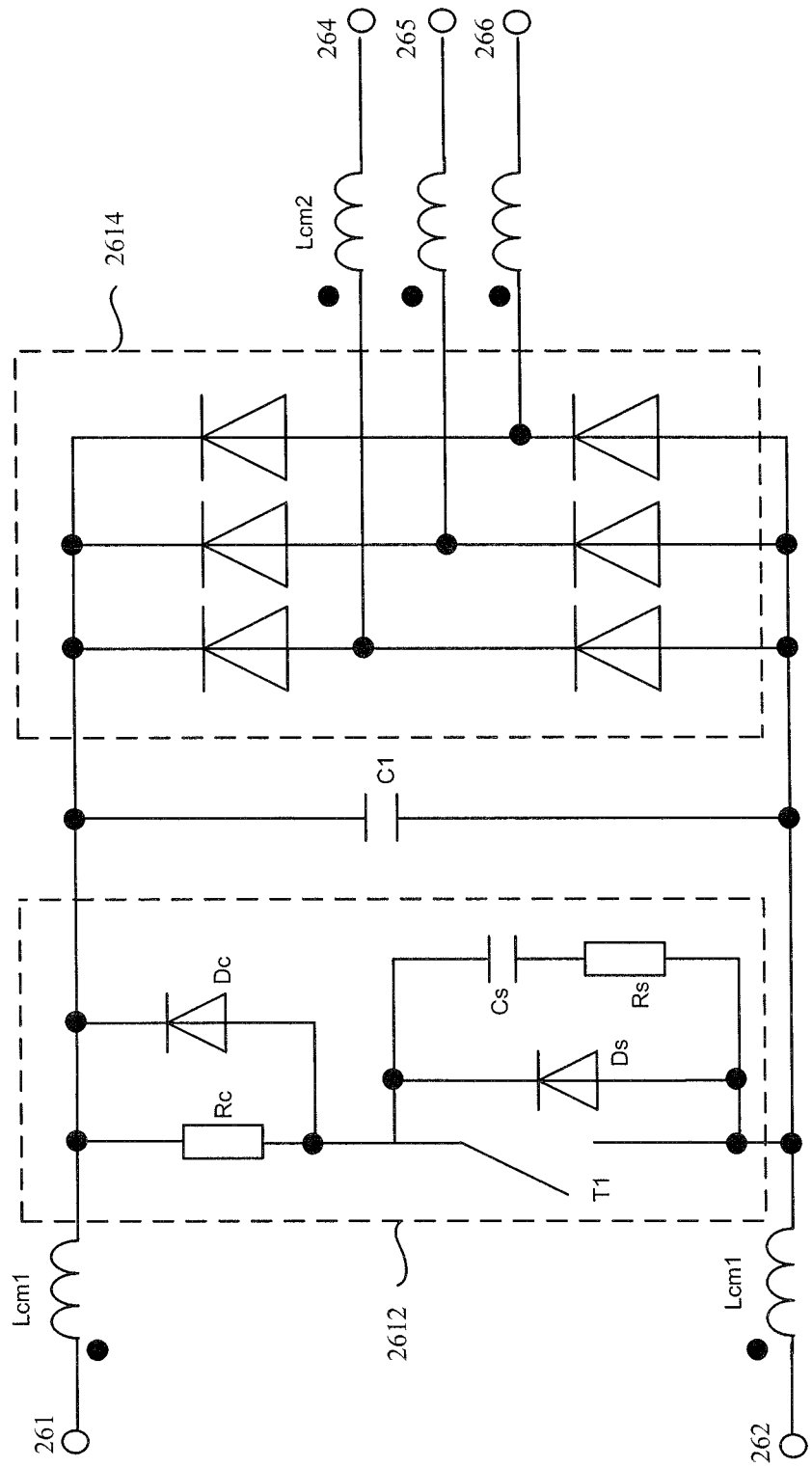
FIG. 4 illustrates a circuit diagram of an embodiment of the power circuit in FIG. 3.

FIG. 4 illustrates a circuit diagram of an embodiment of the power circuit in FIG. 3. Referring to FIGS. 3 and 4, the overvoltage protection module 2612 of the power circuit 26 includes a discharge resistor Rc and a switch element T1. In an embodiment, the switch element T1 is a single switch element, such as a full-controlled power element, for example, an IGBT (insulated gate bipolar transistor), an IGCT (integrated gate commutated thyristor) or an IEGT (injection enhanced gate transistor). In other embodiments, the switch element T1 and the discharge resistor Rc are coupled in series to form a discharge unit, and a plurality of discharge units are coupled in parallel. Switch elements in at least a portion of the discharge units may be turned on simultaneously, so as to drive the overvoltage protection module into operation.

Furthermore, the discharge unit further includes a freewheeling unit coupled to the discharge resistor Rc in parallel, so as to provide a freewheeling circuit for the discharge resistor Rc when the switch element is switched off. For example, the freewheeling unit is a freewheeling diode Dc or another electronic element having a freewheeling function.

Moreover, the discharge unit further includes a snubber unit coupled in parallel to the switch element T1. The snubber unit has a diode Ds and a snubber branch circuit coupled in parallel to the diode Ds. The snubber branch circuit includes a capacitor Cs and a resistor Rs coupled in series, so as to provide current buffer to the switch element at the moment of switching on or off the switch element.

In order to suppress the common mode current of the power circuit 26 effectively, in some embodiments, the power circuit 26 further includes a common mode choke Lcm2 arranged between the rectifier module 2614 and the output terminals 264-266 of the power circuit, thereby suppressing the common mode current. In another embodiment, the power circuit 26 further includes a common mode choke Lcm1 arranged between the input terminals 261 and 262 of the power circuit and the overvoltage protection module 2612, thereby suppressing the common mode current. Those with skills in the art should understand that the power circuit 26 may only include the common mode choke Lcm2 or the common mode choke Lcm1, or may also include both the common mode choke Lcm2 and the common mode choke Lcm1, so as to suppress the common mode current.

Figure 5:
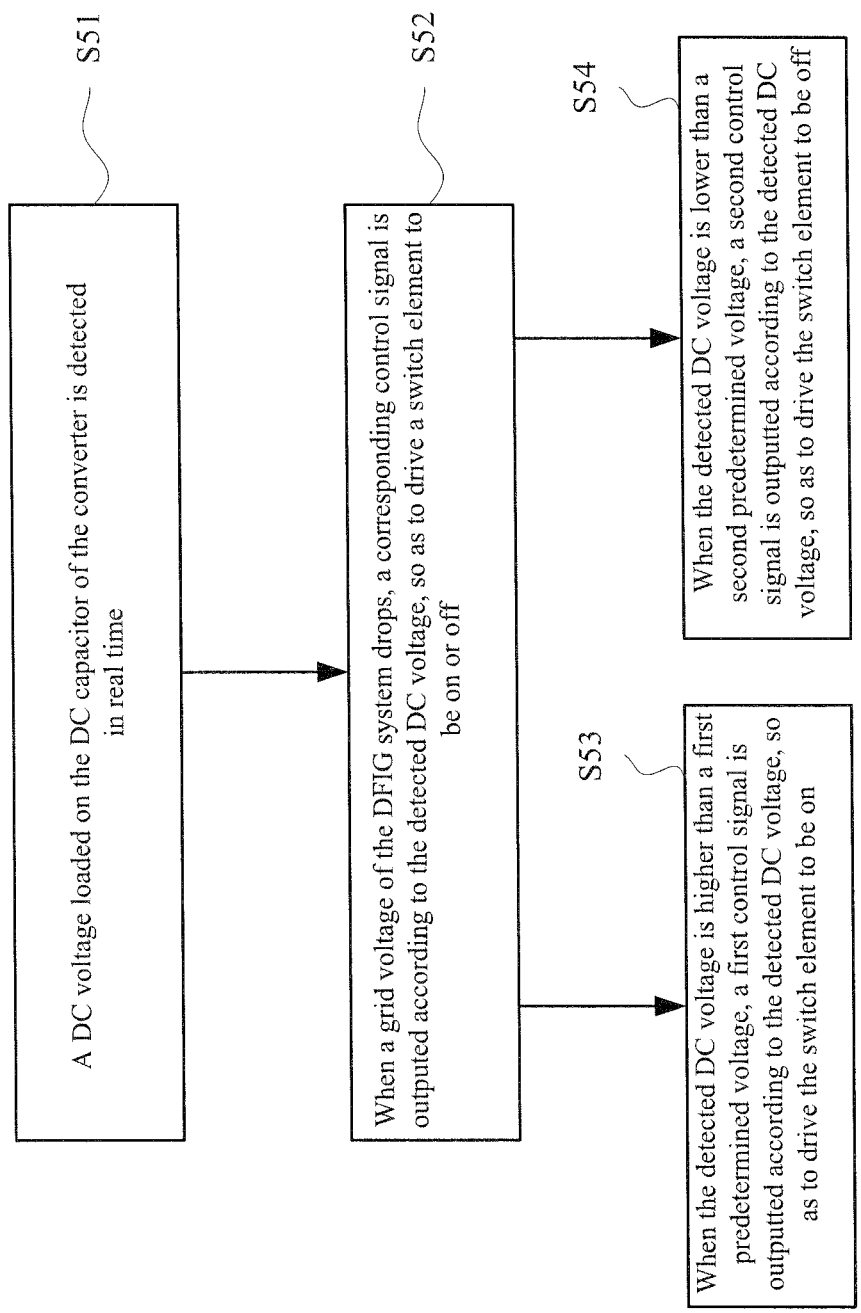
FIG. 5 illustrates a flow chart showing a DC chopping method for the DFIG system according to another aspect of the present invention.

FIG. 5 illustrates a flow chart showing a DC chopping method for the DFIG system according to a further aspect of the present invention. Referring to FIG. 5, at first, step S51 is performed, wherein a DC voltage loaded on the DC capacitor of the converter is detected in real time; then step S52 is performed, wherein when a grid voltage of the DFIG system drops, a corresponding control signal is outputted according to the detected DC voltage, so as to drive a switch element to be on or off; and subsequently, step S53 or S54 is performed, wherein in step S53, when the detected DC voltage is higher than a first predetermined voltage, a first control signal is outputted according to the detected DC voltage, so as to drive the switch element to be on, and in step S54, when the detected DC voltage is lower than a second predetermined voltage, a second control signal is outputted according to the detected DC voltage, so as to drive the switch element to be off.

In an embodiment, when the grid voltage of the DFIG system drops, and the detected DC voltage is higher than the threshold voltage of the overvoltage protection, a driving signal is still sent to the generator-side inverter of the converter to allow the generator-side inverter to be operated normally, so as to send reactive power or active power to the electric grid.

Figure 6:
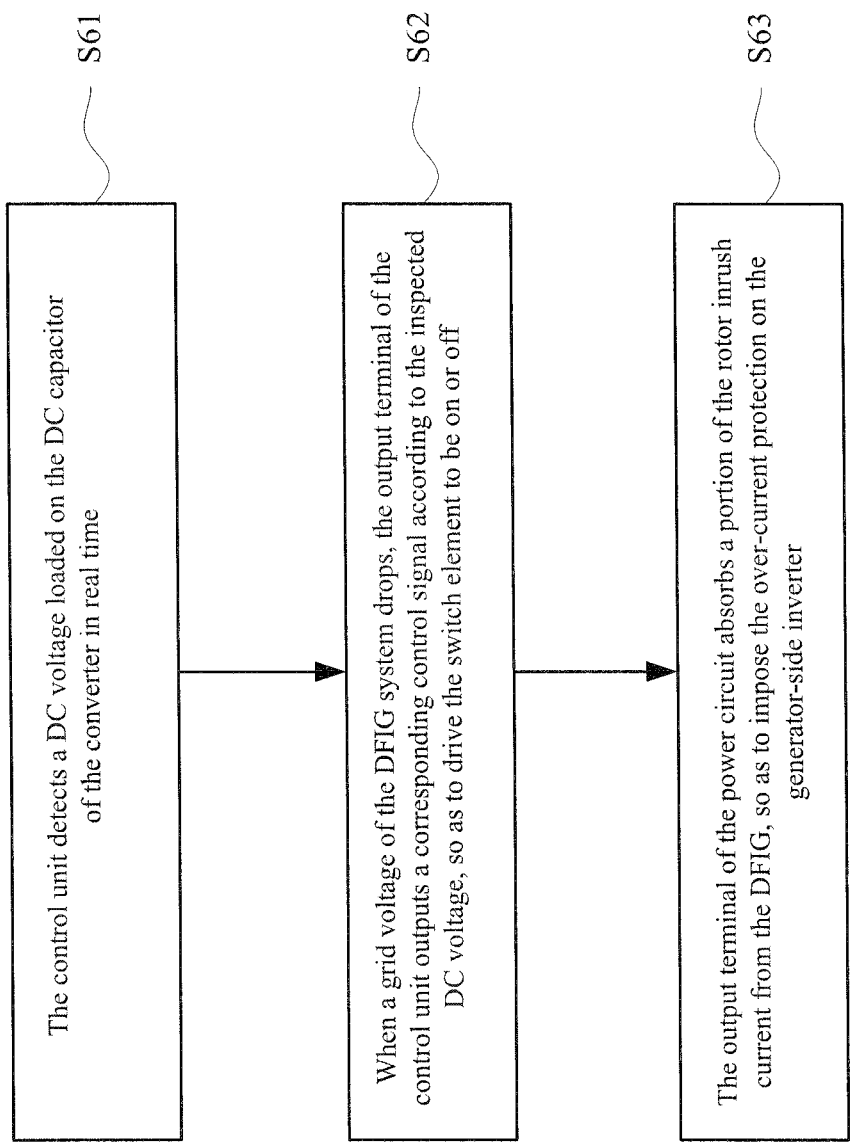
FIG. 6 illustrates a flow chart showing a DC chopping method for the DFIG system according to a further aspect of the present invention.

FIG. 6 illustrates a flow chart showing a DC chopping method for the DFIG system according to a yet further aspect of the present invention. In the DC chopping method, step S61 is first performed, wherein the control unit detects a DC voltage loaded on the DC capacitor of the converter in real time. Then steps S62 and S63 are performed, wherein when a grid voltage of the DFIG system drops, the output terminal of the control unit outputs a corresponding control signal according to the detected DC voltage, so as to drive the switch element to be on or off; and the output terminal of the power circuit absorbs a portion of the rotor inrush current from the DFIG, so as to impose over-current protection on the generator-side inverter. It should be pointed out that the aforementioned steps S62 and S63 are both performed when the grid voltage of the DFIG system drops, and there is no specific sequence of the steps S62 and S63. For example, the steps S62 and S63 may be performed simultaneously.

By using the DC chopper and the DC chopping method of the present invention, the input terminal of the control unit is electrically coupled to two terminals of the DC capacitor of the converter, so as to detect a DC voltage in real time. When the grid voltage of the DFIG system drops and the detected DC voltage is higher than the threshold voltage, the control unit outputs a control signal, so as to drive the switch element to be on, thereby enabling the overvoltage protection module. At the same time, the output terminal of the power circuit of the DC chopper can also absorb a portion of the rotor inrush current from the DFIG, so that the rotor inrush current flowing into the rotor-side inverter of the converter is low, thereby imposing over-current protection on the rotor-side inverter. Furthermore, when the DC chopper is driven into operation, the driving signal of the rotor-side inverter does not need to be locked, and thus the control manner of the converter is much more flexible.

Although the present invention has been disclosed with reference to the above embodiments, these embodiments are not intended to limit the present invention. It will be apparent to those of skills in the art that various modifications and variations can be made without departing from the spirit and scope of the present invention. Therefore, the scope of the present invention shall be defined by the appended claims.

What is claimed is:

1. A DC chopper suitable for a DFIG system comprising a converter and a DFIG, the DC chopper comprising:
 a control unit having at least one input terminal and an output terminal, wherein the at least one input terminal of the control unit is electrically coupled to two ends of a DC capacitor of the converter, so as to detect a DC voltage; and a power circuit electrically coupled to the converter, the DFIG and the control unit, wherein the power circuit comprises:

an input terminal coupled in parallel to the DC capacitor of the converter, wherein the DC capacitor is located between a grid-side inverter and a generator-side inverter of the converter;

an overvoltage protection module coupled to the input terminal of the power circuit, wherein the overvoltage protection module comprises at least one discharge unit formed from a discharge resistor and a switch element which are coupled in series, and the switch element is electrically coupled to the output terminal of the control unit;

a rectifier module coupled to the overvoltage protection module in parallel; and an output terminal coupled to the rectifier module and the DFIG, wherein, when a grid voltage of the DFIG system drops, the output terminal of the control unit outputs a corresponding control signal to drive the switch element to be on or off; and the output terminal of the power circuit absorbs a portion of rotor inrush current from the DFIG, so as to implement over-current protection on the generator-side inverter.

2. The DC chopper of claim 1, wherein when the grid voltage of the DFIG system drops, and the DC voltage detected by the control unit is higher than a first predetermined voltage, the output terminal of the control unit outputs a first control signal to drive the switch element to be on.

3. The DC chopper of claim 2, wherein when the grid voltage of the DFIG system drops, and the DC voltage detected is higher than the first predetermined voltage, another output terminal of the control unit still sends a control signal to the generator-side inverter of the converter to allow the generator-side inverter to be operated normally, and the DFIG system sends reactive power to the electric grid, so as to satisfy the LVRT requirement.

4. The DC chopper of claim 1, wherein the discharge unit further comprises:
a freewheeling unit coupled to the discharge resistor in parallel, so as to provide a freewheeling circuit for the discharge resistor when the switch element is driven off.

5. The DC chopper of claim 1, wherein the overvoltage protection module comprises a plurality of discharge units, and one or more discharge units are turned on according to different sequences so as to drive the overvoltage protection module into operation.

6. The DC chopper of claim 1, wherein the power circuit further comprises:
a first common mode choke arranged between the rectifier module and the output terminal of the power circuit, so as to suppress common mode current.

7. The DC chopper of claim 1, wherein the power circuit further comprises:
a second common mode choke arranged between the input terminal of the power circuit and the overvoltage protection module, so as to suppress the common mode current.

8. The DC chopper of claim 1, wherein when the DC voltage detected by the control unit is lower than a second predetermined voltage, the output terminal of the control unit sends a second control signal, so as to drive the switch element off.

9. A DC chopping method for a DFIG system comprising a converter and a DFIG, wherein the DFIG system further comprises a DC chopper of claim 1, and the DC chopping method comprises:
detecting a DC voltage loaded on a DC capacitor of the converter in real time by using the control unit;
outputting a corresponding control signal from the output terminal of the control unit when a grid voltage of the DFIG system drops, so as to drive a switch element on or off; and
absorbing a portion of rotor inrush current from the DFIG by using the output terminal of the power circuit, so as to implement over-current protection on a generator-side inverter.

10. A DFIG system comprising a converter and a DFIG, wherein the system further comprises:
a DC chopper of claim 1.

11. The DFIG system of claim 10, wherein when the grid voltage of the DFIG system drops, and the DC voltage detected by the control unit is higher than a first predetermined voltage, the output terminal of the control unit outputs a first control signal to drive the switch element to be on.

12. The DFIG system of claim 11, wherein when the grid voltage of the DFIG system drops, and the DC voltage detected is higher than the first predetermined voltage, another output terminal of the control unit still sends a control signal to the generator-side inverter of the converter to allow the generator-side inverter to be operated normally, and the DFIG system sends reactive power to the electric grid, so as to satisfy the LVRT requirement.

13. The DFIG system of claim 10, wherein the discharge unit further comprises:
a freewheeling unit coupled to the discharge resistor in parallel, so as to provide a freewheeling circuit for the discharge resistor when the switch element is driven off.

14. The DFIG system of claim 10, wherein the overvoltage protection module comprises a plurality of discharge units, and one or more discharge units are turned on according to different sequences, so as to drive the overvoltage protection module into operation.

15. The DFIG system of claim 10, wherein the power circuit further comprises:
a first common mode choke arranged between the rectifier module and the output terminal of the power circuit, so as to suppress common mode current.

16. The DFIG system of claim 10, wherein the power circuit further comprises:
a second common mode choke arranged between the input terminal of the power circuit and the overvoltage protection module, so as to suppress the common mode current.

17. The DFIG system of claim 10, wherein when the DC voltage detected by the control unit is lower than a second predetermined voltage, the output terminal of the control unit sends a second control signal, so as to drive the switch element off.

* * * * *